United States Patent Office 3,361,723
Patented Jan. 2, 1968

3,361,723
THIOL CONTAINING POLYETHER AND PROCESS
FOR PREPARATION THEREOF
Salim N. Ephraim, Elizabeth, N.J., assignor to Synergy Chemicals, Inc., Linden, N.J., a corporation of Delaware
No Drawing. Filed Feb. 4, 1965, Ser. No. 430,471
9 Claims. (Cl. 260—79)

This invention relates to novel thiol-containing polymeric compositions and the method of preparing same. More particularly, this invention relates to thiol-containing polyether products and the method for producing said polyether compositions.

Thiol-containing polymers have in the past been commercially manufactured principally by reaction of low molecular weight dihalides and polyhalides with alkali polysulfides, thus forming a polymer having polysulfide linkages which are subsequently cleaved by reduction into smaller fragments that are terminated with thiol groups (SH). Alternatively, low molecular weight dihalides are converted to dithiols by reaction with alkali hydrosulfides and subsequently oxidized to yield thiol terminated polymers. The polythiol products obtained from the processes outlined above yield a polymeric product having a very wide molecular weight distribution and poor product uniformity. Moreover, such products have a very undesirable odor due to low molecular weight fractions bearing sulfide or thiol groups. A further disadvantage is that the above referred to processes yield copious quantities of undesirable by-products such as alkali halides for each mole of desired product.

Finally, in terms of diversity of use, the products obtained by means of these processes are extremely limited. For example, in terms of the number of thiol groups per mole these products normally have only one to three thiol groups per mol, and thus their utility is limited to elastomeric type compositions. Another outstanding drawback that is associated with these thiol terminated polymers that had been made heretofore is the fact that the sulfide linkages throughout the polymer chain are subject to scission with alkali as well as reducing agents.

Broadly stated, the process of the present invention comprises forming a polyether material having pendant functional groups which are convertible to thiol (SH) groups. In the usual case, the polyether is formed by polymerization of an oxirane or epoxy material in the presence of an active hydrogen material, in which case the pendant functional groups must be unreactive to the oxirane group. The process is generally carried out in the presence of a catalyst.

Polyethers having only terminal convertible functional groups may be formed by reacting an oxirane compound in the presence of an active hydrogen compound bearing the convertible functional group and copolymerizing the resulting product with a dioxirane compound. Polyether polymers bearing a plurality of convertible functional groups may be formed by the homopolymerization of an organic oxide bearing the convertible functional group, and by copolymerization of monomeric epoxy compounds wherein at least one of the epoxy compounds bears the convertible functional group. Moreover, one of the reactants in the copolymerization may be a prepolymer. A significant feature of the process of this invention is that the convertible functional group is present as a pendant group on the polyether chain and the various combinations of monomers and prepolymers that will combine to produce the epoxy polymeric material of this invention will become obvious to those skilled in the art having the benefit of this disclosure.

For example, the thiol containing polyether products of this invention may be prepared by polymerizing an epihalohydrin or other halogen bearing epoxides either alone or in combination with an alkylene oxide and converting the halo groups of the resulting polyether to thiol groups by reaction with an alkali hydrosulfide. The reaction may be illustrated by reference to epichlorohydrin as the halogen bearing epoxide.

Epihalohydrin polymerizes in the presence of active hydrogen atoms (initiator) to form a polyether. This reaction proceeds readily, particularly under acid conditions as follows:

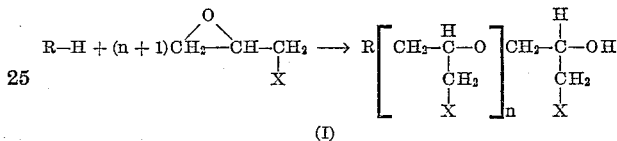

(I)

wherein R—H is a compound having a single active hydrogen, such, as, for example, methyl alcohol.

It is obvious that if R—H is replaced by an intermediate containing more than one active hydrogen, polymerization of the epihalohydrin proceeds at all active hydrogen sites:

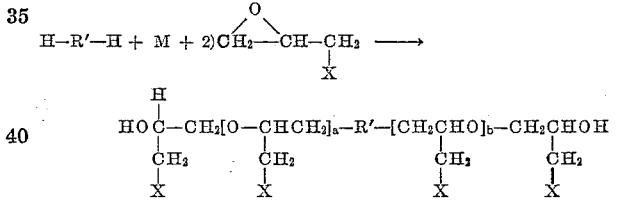

(II)

wherein H—R'—H is an intermediate containing two active hydrogens such as ethylene glycol, and $a+b=M$.

It is also obvious that if H—R'—H is replaced by an intermediate containing three or more active hydrogens per molecule, and sufficient epihalohydrin is added, then polymerization would accordingly proceed at all active hydrogen sites.

Alkylene oxides, such as, for example, ethylene oxide also polymerize in the presence of active hydrogen in the same manner and under the same conditions as epihalohydrins to form polyesters. Consequently, the addition of epihalohydrins to active hydrogen compounds may be preceded, followed, or alternated with the addition of alkylene oxides to yield polyesters containing halogens at predetermined patterns. For example, if I alternatively add to ethyl alcohol one mole epichlorohydrin and one mole of ethylene oxide, there would predominantly be obtained the following polymeric product.

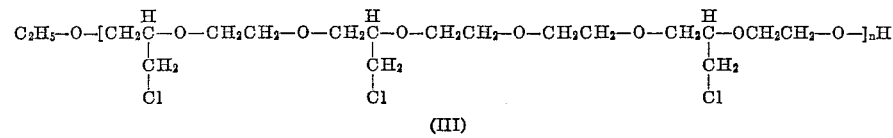

(III)

Alternatively, two moles of epichlorohydrin could be added to the ethyl alcohol followed by 10 moles ethylene oxide, followed by two mols of epichlorohydrin followed by two moles of ethylene oxide whereby we would obtain the following species:

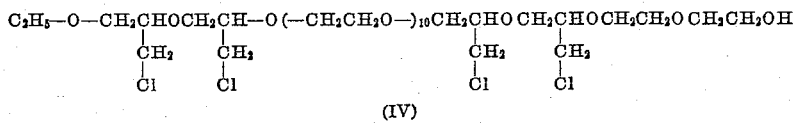

(IV)

Thus, as shown in the discussion and reactions of Formulas III and IV the variation in spacing between the halogen atoms along the polyether chain is unlimited and it is possible to control the nature of the end-product thiol polymer. The above examples are given as illustrations but they obviously represent only a very small number of the possible variations.

The possible variations in the spacing of the halogen atoms along the polyether chains discussed above can be extended further by considering additional alternatives. For example, in Equation I above, replacing R—H with an active hydrogen compound which contains one or more halogens, such as ethylene chlorohydrin or glycerin dichloride, such halogens would of course become part of the polymer structure, and represent reactive sites for displacement reactions to follow. For example, if R—H in Equation I is replaced by ethylene chlorohydrin, then reaction with epihalohydrin would yield the following species:

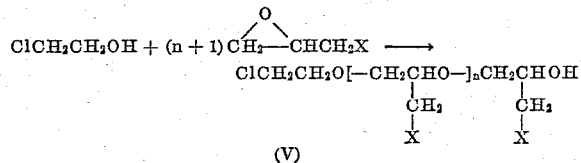

(V)

Further variations may be obtained by replacing a part or all of the alkylene oxide or epihalohydrin with a diepoxide, or a polyepoxide. These polyepoxides add to active hydrogen intermediates under the same condition as monoepoxides. In the case of polyepoxide, however, addition to active hydrogen compounds proceeds along two or more sites giving rise to chain extension as well as cross-linking between two or more chains. For example, if we are to add to one mole of butyl alcohol two moles of epichlorohydrin followed by two moles of propylene oxide, we would predominantly obtain the following species:

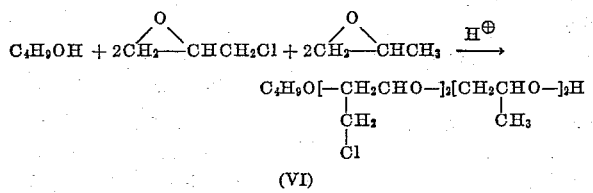

(VI)

Now if ½ mole of butadiene dioxide is added to the above product, we would predominantly obtain the following:

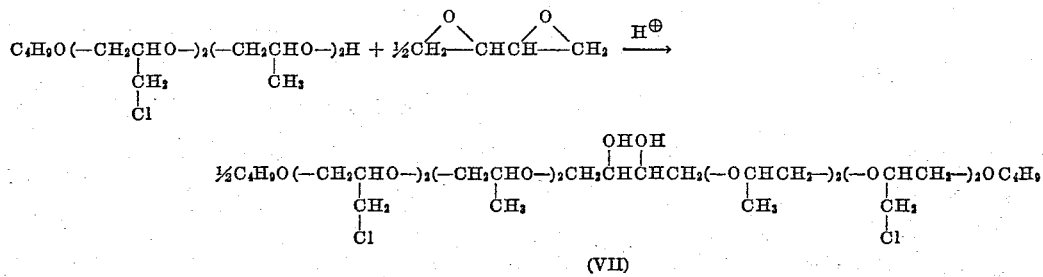

(VII)

Also, the product of Equation VII may be extended by addition of further amounts of alkylene oxide or epichlorohydrin or crosslinked by addition of further amounts of polyepoxide.

In making the homo- and copolymers bearing the convertible functional groups according to this invention, the monomeric material or mixtures thereof and the catalyst may simply be charged into a closed vessel and heated until polymerization is complete. In the case where a copolymer is being formed depending upon the nature of the desired product, the monomers or prepolymer may be charged simultaneously or consecutively or alternatively one or the other in whatever mole ratios are desired. The reaction mass is advantageously agitated during polymerization. The proportion of catalyst may vary from .05 to 15 percent by weight of the epoxide, 1 to 5 being preferred. Polymerization may be carried out at a temperature in the range of 0 to 200° C., with 20 to 100° C. being preferred.

Instead of effecting mass or bulk polymerization as described above, the process may be carried out with the monomeric or polymeric reactants, catalyst and polymer product all dissolved or suspended in an inert diluent. In general, equal proportions of reactants and diluent are used. Suitable diluents are diethyl ether, diisopropyl ether, petroleum ether, benzene and n-hexane. It is advantageous to choose a diluent which boils at about polymerization temperature, and to heat the mass to induce gentle reflux, thereby assisting in the close control of the reaction temperature.

Examples of monomeric halogen bearing epoxide compounds suitable for polymerization are: epichlorohydrin; epibromohydrin; and, epifluorohydrin.

Examples of suitable epoxides for use in copolymerization with halogen bearing epoxides are: alkylene oxides, such as ethylene oxide, propylene oxide, 1,2-butylene oxide, 2,3-butylene oxide, octylene oxide; cycloalkylene oxides, such as cyclohexene oxide; aryl substituted oxides, such as styrene oxide, glycidol; glycidyl ethers, such as, methyl glycidyl ether, allyl glycidyl ether, phenyl glycidyl ether; diepoxides, such as, vinyl cyclohexene dioxide, bicyclopentadiene dioxide, polyglycidyl ethers, such as, the diglycidyl ether of bisphenol A, butanediol diglycidyl ether, trimethylol-propane triglycidyl ether.

Examples of suitable initiators are: aliphatic monohydric alcohols, such as, methanol, ethanol, 2-butanol, 1, octanol; alcohol ethers, such as, methyl cellosolve, ethyl cellosolve; aliphatic polyhydric alcohols, such as, ethylene glycol, 1,3-butanediol, 1,4-butanediol, glycerol, sorbitol; hydroxyl terminated polyethers, such as, polyethylene glycols, polypropylene glycols, polybutylene glycols, dihydroxypropyl ether of bisphenol A; hydroxyl terminated polyesters resulting from reaction of polybasic carboxylic acids with polyhydric alcohols such as polyethylene glycol adipate, polyglycerol phthalate; haloalcohols, such as, ethylene chlorohydrin, glycerol dichloride; monohydric phenols, such as, phenol, xylenol, p-chlorophenol; dihydric mononuclear phenols, such as, resorcinol, hydroquinone; polyhydric mononuclear phenols, such as, phloroglucinol; dihydric dinuclear phenols, such as bisphenol A, bis-p-hydroxyphenyl methane; polyhydric polynuclear phenols, such as phenolic novolacs made by condensation of phenol with formaldehyde under acid conditions; monocarboxylic acids, such as, acetic acid, 2-ethyl hexoic acid, benzoic acid; dicarboxylic acids, such as, adipic acid, phthalic acid, oxalic acid; polycarboxylic acids, such as, citric acid, carboxyl terminated polyesters such as prepared by reaction of polybasic acids with polyhydric alcohols, said polyesters being terminated with hydroxyl groups, carboxyl groups or both; hydroxyalkyl amines, such as, ethanol amine, diethanol amine, triethanol amine, dihydroxyethyl anilin.

Examples of catalysts suitable for the polymerization reaction include: Lewis-type acids and organometallic products exhibiting the reactivity of Lewis acids, such as, $BF_3$, $AlCl_3$, $SnCl_4$, $ZnCl_2$, $FeCl_2$, $FeCl_3$, $FeBr_2$, $FeBr_3$, $BeCl_2$, $BCl_3$, $SbCl_5$, $TiCl_4$, $CoCl_2$, $NiCl_2$, $BiCl_2$, $InCl_3$, $ZrCl_4$, titanium tetraalkyl esters, aluminum alkyls and aluminum alkoxides, diethyl zinc in combination with alumina, or oxygen, HF and complexes of HF with $PF_5$, protonic acids and acid salts such as sulfuric acid, and sodium hydrogen sulfate, acid clays. Basic catalysts and basic salts of weak acids may also be used to polymerize alkylene oxides, but not epihalohydrins, since in the case of the latter, dihydrohalogenation occurs. Examples of basic catalysts applicable to alkylene oxide polymerization are: alkalies, such as sodium hydroxide, lithium hydroxide, potassium hydroxide; alkali salts of weak acids, such as, sodium carbonate, alkaline earth carbonates, sodium methoxide, potassium methoxide.

The polymer formation step discussed above yields halogen bearing polymers of various configurations. Reaction of these halogen bearing polymers with alkali hydrosulfides results in the displacement of these halogens with thiol groups, and hence the thiol terminated or thiol containing polymers of this invention are obtained.

Suitable alkali hydrosulfides include sodium hydrosulfide, potassium hydrosulfide and lithium hydrosulfide.

The reaction with alkali hydrosulfides may be carried out in bulk, in aqueous solution, or as a suspension in an organic solvent. Preferably, the alkali hydrosulfide is added in the form of an aqueous solution to the intermediate polyhalide, and replacement of the halogens carried out at about 50–100° C. with constant agitation for 1–5 hours depending upon dilution and the nature of the intermediate. Upon completion of the reaction with the alkali hydrosulfide, the product is then freed of salt and excess hydrosulfide by repeated washing with pure water followed by vacuum distillation to remove volatile matter.

Generally, stoichiometric or higher quantities of alkali hydrosulfide are preferable in the reaction with the halogenated intermediate. However, quantities lower than stoichiometric can also be used if it is desired to leave some of the halogens as such and without conversion to the thiol group.

The polymers of this invention have a wide range of valuable applications, for example, these polymers can be extended, crosslinked, or cured with addition of various oxidizing agents such as lead oxides, organic peroxides, quinones, etc. thereby yielding thermosetting compositions that are valuable as adhesives, caulking compounds, protective coatings, casting and encapsulating media and many others.

Also the thiol polymer of this invention can be readily crosslinked with epoxy resins, particularly in the presence of basic catalysts, to yield valuable copolymers.

By virtue of their active hydrogens these thiol polymers of this invention can be crosslinked with a variety of other active agents such as isocyanates, ketenes, polybasic carboxylic acids and anhydrides, etc.

Thus, it is that the thiol polymers of this invention are valuable thermosetting intermediates.

The polymers of the invention obtained by said process are generally clear and light in color, and in contrast to the thiol terminated polymers made heretofore, the new products are practically odorless in view of their molecular weight uniformity and the presence of only a small ratio of sulfide linkages throughout their structure. In fact the sulfide linkage is completely absent in certain of these polymers before they are crosslinked. Moreover, these new thiol terminated polymers are extremely versatile in comparison to the older types. For example, while the thiol terminated polymers known heretofore are limited in the number of thiol groups per mol as pointed out earlier, the new thiol terminated polymers have no limit as to the number of thiol groups per mole. The new thiol terminated polymers may have twenty or more thiol groups per mole in contrast to the older types which are limited to a maximum of about 3. Thus, depending upon the number of thiol groups per mole, the new thiol terminated polymers can be crosslinked to yield products ranging from hard tough plastics to very flexible elastomers. The uniformity and structural diversity of the new thiol terminated polymers are clearly borne out by their physical properties upon cure which are found to be superior to the older types in many respects.

The following examples further illustrate the process and polymer products of this invention.

*Example 1*

40 grams (0.1 mole) of polyethylene glycol having a molecular weight of 400 are placed into a 400 ml. beaker provided with a thermometer and magnetic stirrer. Agitation is applied, and $BF_3$ gas is bubbled into the glycol for a period of 3 minutes. Agitation is then continued while 37 grams (.4 mole) of epichlorohydrin are added dropwise over a period of one-half hour. The reaction is highly exothermic and cooling is externally applied to keep the temperature at about 60° C. Upon adding all of the epichlorohydrin, the reaction mixture is kept at 60° C. by application of external heat for one-half hour to complete the reaction. The reaction mixture is then cooled to 30° C., and 17.4 grams (0.3 mole) of propylene oxide are added dropwise over a period of one half hour. The reaction is again highly exothermic, and external cooling is applied to keep the temperature at about 30° C. throughout the propylene oxide addition. The reaction mixture is then heated to 60° C., and 75 grams (0.6 mole) of 45% aqueous sodium hydrosulfide are added. Heat and agitation are continued up to a temperature of 85° C., and the reaction mixture kept under these conditions for one hour. Heat is then discontinued, and about 50 grams of water is added to dissolve the precipitated salt. Agitation is discontinued, and the reaction mixture separates into a top organic layer, and a bottom aqueous layer which contains dissolved salt and excess sodium hydrosulfide. The aqueous layer is then drained off, and the organic layer washed repeatedly with pure water until the wash water becomes neutral. The aqueous layer is then drained off, and the organic layer placed into a flask provided with a thermometer, agitator, heating mantle, downward condenser, and a vacuum outlet. Heat, vacuum, and agitation are applied, and volatile matter distilled off up to 100° C. and 28″ of vacuum. The product is then kept one hour longer under these conditions to remove the last traces of volatile matter. Heating is then discontinued, the contents of the flask cooled to room temperature, and vacuum broken off. There is obtained 82 grams (theory 93 grams) of a clear, colorless, semi-viscous resin. Elemental analysis yielded the following results:

Found by *analysis*.—O, 30.07; C, 49.58; H, 8.07; S, 12.46; Cl, 0.00. Theoretical: O, 30.5; C, 48.2; H, 7.5; S, 13.8; Cl, 0.0.

It is expected that the predominant structural species of this Example I is:

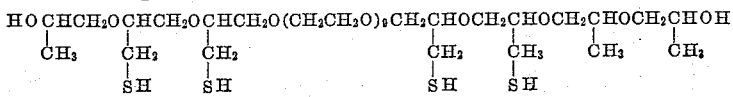

10 grams of the product are thoroughly mixed with 2 grams of powdered lead dioxide. Part of the mixture (or 5 grams) is placed into an aluminum cup and heated over a hot plate. The product is found to set within a few minutes into a tough, highly elastic material. The rest of the mixture is allowed to stand overnight at room temperature, and was also found to set into a highly elastic material.

5 grams of the product are dissolved into 12 grams of xylene and part of the solution applied as a thin film over a tin plate. The film was found to set overnight simply by air oxidation, and without the aid of a catalyst into a tough, tack free film with a high degree of adhesion to the tin plate.

10 grams of the thiol polymer product are mixed with 10 grams of a diglycidyl ether of bisphenol A having an epoxide equivalent of 190. 1.2 grams of triethylenetetramine are then added and blended thoroughly. The mixture is then cast into an aluminum cup and allowed to stand at room temperature. The casting is found to harden within 20 minutes at room temperature into a tough plastic that is very highly resistant to impact.

Example II 22.5 grams (0.25 mole) of 1,4 butanediol are charged into a flask fitted with a thermometer, agitator and external cooling bath. 5 grams of stannic chloride are added while stirring. 114 grams (2 moles) of propylene oxide are then added gradually over a period of 45 minutes. The reaction is highly exothermic and external cooling is constantly applied throughout the addition to keep the temperature at about 35° C. Upon adding all of the propylene oxide, 46.25 (0.5 mole) of epichlorohydrin are added in the same manner over a period of 25 minutes while keeping the temperature at about 60° C. with the aid of external cooling. Another 114 grams of propylene oxide and another 46.25 grams of epichlorohydrin followed by 29 grams (0.5 mole) of propylene oxide are added in the same manner, and under the same conditions given above. The resulting clear, colorless adduct is then heated to and kept at 60° C. for one hour to complete the reaction.

74.3 grams of the above adduct (containing 0.2 equivalent of chlorine) are charged into a 250 ml. flask provided with a thermometer, heater, and agitator. 37.6 grams (0.3 equivalent) of 45% aqueous sodium hydrosulfide are added and the mixture heated with agitation to 95° C., and kept at 95° C. for one hour. 50 ml. of water are then added to dissolve the precipitated salt, and the reaction mixture separates into an upper organic layer and a lower aqueous layer. The aqueous layer is drained off and 75 ml. of xylene are added to dissolve the organic layer. The xylene solution is then washed twice with pure water to a pH of 8, the aqueous layers discarded, and the solution charged into a 250 ml. flask provided with an agitator, thermometer, heating mantle, downward condenser, and a vacuum outlet. Heat, agitation, and vacuum are applied, and the xylene distilled off up to 100° C. and 28" of vacuum. After all of the xylene is removed, the product is kept at 100° C. and 28" vacuum for an additional hour to remove traces of volatiles. Heat and vacuum are then discontinued, and the product filtered. There is obtained 65 grams of clear, colorless, semiviscous resin.

10 grams of the resin are thoroughly mixed with 1.5 grams of lead dioxide. Part of the mixture is poured into an aluminum weighing dish and placed over a hot plate. The mixture set within 4 minutes into a highly elastic, tough product.

10 grams of the resin obtained in Example II are mixed with 10 grams of a diglycidyl ether of bisphenol A. 1.2 grams of benzyldimethyl amine are added and blended thoroughly. The mixture is cast into an aluminum weighing dish and allowed to stand overnight at room temperature. Upon examination, the casting is found to be tough and highly resistant to impact.

Example III 32 grams of methanol (1 mole), and 5 grams of ferric chloride are charged into an autoclave fitted with a thermometer, agitator, cooling coil and addition inlet. The autoclave is then closed and the solution of ferric chloride in methanol is heated to 85° C. 185 grams of epichlorohydrin (2 moles) are then fed into the autoclave over a period of ½ hour holding the temperature at 80–90° C. with cooling. 440 grams of ethylene oxide (10 moles) are then fed into the autoclave over a period of one and a half hours followed by 185 grams of epichlorohydrin over a period of ½ hour. The temperature throughout was held between 80–90° C. Upon addition of all of the epichlorohydrin, the reaction mixture was kept under constant agitation at 80–90° C. for one hour. The autoclave was then opened, and the reaction mixture transferred into a 3 liter glass reactor provided with an agitator, thermometer, condenser and a heating mantle. 750 grams of 45% sodium hydrosulfide (6 moles) are added to the reaction mixture and the contents of the reactor are heated to 85° C. for 1½ hours with constant agitation. The reaction mixture is then cooled to room temperature and found to separate into two layers. The aqueous layer (bottom) is then drained off and the product washed repeatedly with water until the pH is 7–8. Heat and vacuum are then applied and all volatile matter distilled off at 95° C. and 28" of vacuum. Vacuum is then broken off, and 5 grams of Celite filter aid are added, followed by filtration. The product obtained is clear, semiviscous, and is expected to predominantly correspond to the following molecular species:

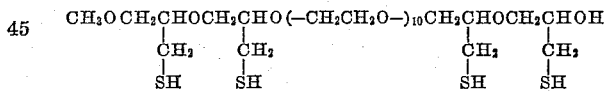

I claim:
1. A thiol-containing polyether polymer having the following structure:

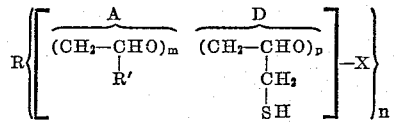

wherein A and D are representative polymeric units, repeating, alternating or both; R is a radical derivable by removal of at least one hydrogen atom from an organic compound having one or more active hydrogen atoms; A or D may be directly attached to R; and wherein R' is a hydrogen, alkyl or aryl radical; $m$ is zero, one or greater than one; $p$ is one or greater than one; X is a hydroxy alkyl group or substituted alkyl group; and $n$ is a number not exceeding the number of active hydrogens in the compound from which R is derived and further when $n$ is one $p$ must be two or more.

2. The polymer of claim 1, wherein R has the following structure:

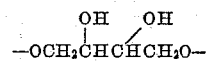

and wherein $n$ equals two.

3. The polymer of claim 1, wherein R has the following structure:

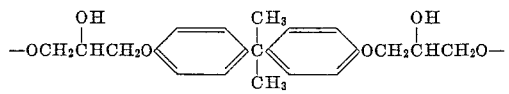

and wherein *n* equals two.

4. The polymer of claim 1 wherein R is an alkyl thiol.

5. The polymer of claim 1, wherein R' is hydrogen.

6. The polymer of claim 1, wherein R' is a methyl group.

7. The polymer of claim 1 wherein R' has the following structure:

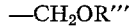

and wherein R''' is an alkyl radical having from 1 to 8 carbon atoms or a phenyl radical.

8. A cured product resulting from the reaction of a polymer having the formula of claim 1 and an oxidizing agent to yield a polysulfide polymer.

9. A cured product resulting from the reaction of a polymer having the formula of claim 1 and a polyepoxide to yield polythiol polyether polymers.

References Cited

UNITED STATES PATENTS

| | | | |
|---|---|---|---|
| 2,205,021 | 6/1940 | Schuette et al. | 260—79 |
| 2,831,830 | 4/1958 | Schroeder | 260—79 |
| 2,992,210 | 7/1961 | Gluckman | 260—79 |
| 2,716,137 | 8/1955 | Patton. | |
| 3,206,482 | 9/1965 | Bright. | |
| 3,277,051 | 10/1966 | Yynstra. | |
| 3,278,496 | 10/1966 | LeFave et al. | 260—79 |
| 3,282,902 | 11/1966 | Panek | 260—79 |
| 3,294,747 | 12/1966 | Frey. | |

OTHER REFERENCES

Gaylord: Polyethers, Part III, "Polyalkylene Sulfides and Other Polythioethers," Interscience Publishers, New York, 1962, pages 25 and 40. Scientific Library and Group 140 QD 305 E7G3.

DONALD E. CZAJA, *Primary Examiner.*

L. J. BERCOVITZ, *Examiner.*

M. I. MARQUIS, *Assistant Examiner.*